(12) United States Patent
Matsumoto

(10) Patent No.: US 7,039,434 B1
(45) Date of Patent: May 2, 2006

(54) MOBILE WIRELESS COMMUNICATION SYSTEM CARRYING OUT COMMUNICATION OF A PORTABLE TERMINAL, AN INFORMATION SOURCE SERVER APPARATUS AND A WIRELESS COMMUNICATION GATEWAY SERVER APPARATUS

(75) Inventor: Hidehiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 09/695,279

(22) Filed: Oct. 25, 2000

(30) Foreign Application Priority Data

Oct. 28, 1999 (JP) .................................. 11-307805

(51) Int. Cl.
*H04B 7/20* (2006.01)

(52) U.S. Cl. .................... 455/517; 455/437; 455/414; 455/433; 455/524; 455/430; 455/414.2; 455/414.3; 455/414.4; 455/443; 455/452.1; 455/448; 455/456.2; 455/456.3; 370/331

(58) Field of Classification Search ............... 455/437, 455/414, 433, 524, 430, 414.2, 414.3, 414.4, 455/443, 452.1, 448, 456.2, 456.3; 320/331
See application file for complete search history.

(56) References Cited

U.S. PATENT DOCUMENTS

| | | | | |
|---|---|---|---|---|
| 5,749,053 A | * | 5/1998 | Kusaki et al. | 455/524 |
| 5,930,699 A | * | 7/1999 | Bhatia | 455/414 |
| 6,173,180 B1 | * | 1/2001 | Hussain et al. | 455/433 |
| 6,424,638 B1 | * | 7/2002 | Ray et al. | 370/331 |
| 6,445,924 B1 | * | 9/2002 | Rasanen | 455/437 |
| 6,449,478 B1 | * | 9/2002 | Valentine et al. | 455/430 |
| 6,453,162 B1 | * | 9/2002 | Gentry | 455/433 |
| 6,580,699 B1 | * | 6/2003 | Manning et al. | 370/331 |
| 6,674,860 B1 | * | 1/2004 | Pirila | 380/247 |

FOREIGN PATENT DOCUMENTS

| | | |
|---|---|---|
| EP | WO 98/34414 | 8/1998 |
| GB | 2 355 563 A | 4/2001 |
| JP | 7-264662 | 10/1995 |
| JP | 9-130861 | 5/1997 |
| JP | 10-210533 | 8/1998 |
| JP | 10-327454 | 12/1998 |
| JP | 11-83976 | 3/1999 |

* cited by examiner

*Primary Examiner*—Joseph Feild
*Assistant Examiner*—David Q. Nguyen
(74) *Attorney, Agent, or Firm*—McGinn IP Law Group, PLLC (57) ABSTRACT

A mobile wireless communication system includes information, a portable terminal, a plurality of wireless communication gateway servers, a switching apparatus, and a wireless telephony server. The switching apparatus sets a connection between the portable terminal and a first wireless communication gateway server or another connection between the portable terminal and a second wireless communication gateway server when the first wireless communication gateway server is congested. The wireless telephony server informs a position of the portable terminal to the wireless communication gateway server.

21 Claims, 8 Drawing Sheets

MOBILE WIRELESS COMMUNICATION SYSTEM CARRYING OUT COMMUNICATION OF A PORTABLE TERMINAL, AN INFORMATION SOURCE SERVER APPARATUS AND A WIRELESS COMMUNICATION GATEWAY SERVER APPARATUS

BACKGROUND OF THE INVENTION

1. Field of the Invention

The present invention relates to a mobile communication system in which a portable terminal accesses information source server apparatus existing on a network through a wireless communication line. More particularly, the present invention relates to a mobile communication system for reducing a time required for a portable terminal to access information source server apparatus, a wireless communication gateway server apparatus, a position information calculation system, a method for reducing a connection time in the system, and a record medium for recording therein a connection time reduction program.

2. Description of the Related Art

Recently, a function has been proposed in which a portable terminal accesses information source server apparatus existing on a network (especially, the Internet) and obtains information from the network.

Figure 1:
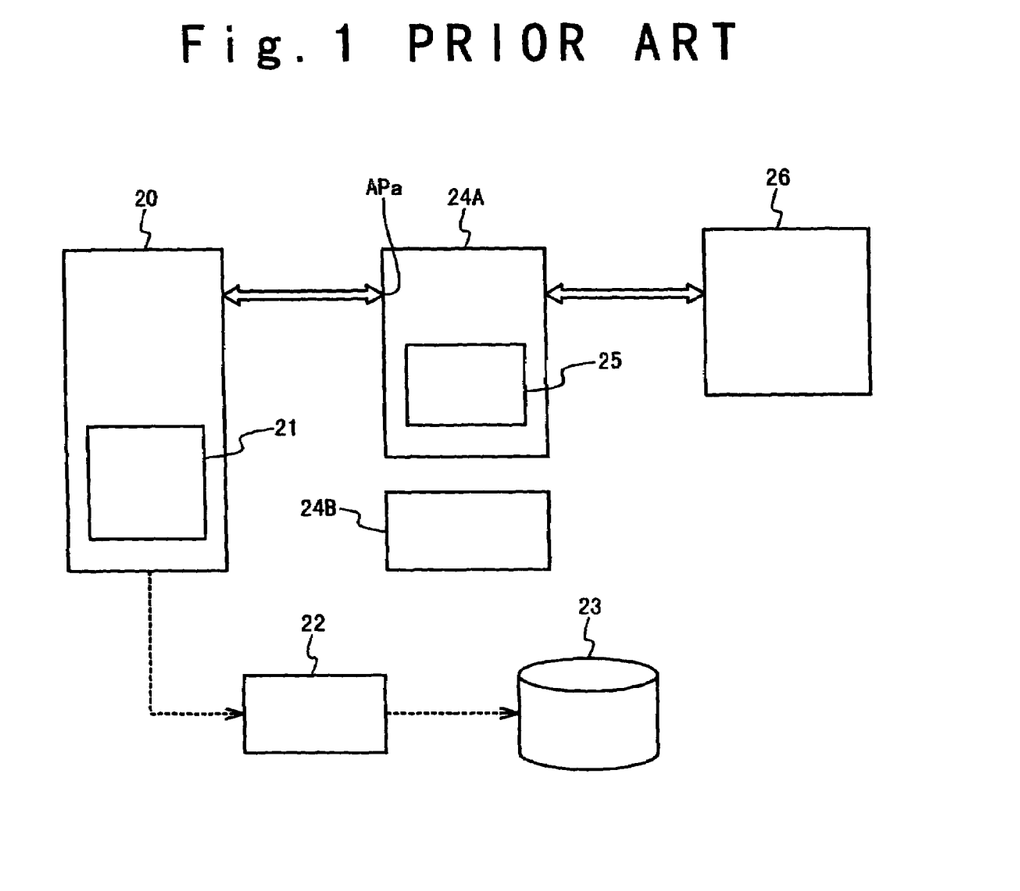
FIG. 1 is a block diagram showing a configuration of a conventional mobile wireless communication system.

FIG. 1 shows an example of a configuration of a system in which this portable terminal accesses the information source server apparatus existing on the network.

As shown in FIG. 1, a dedicated server apparatus referred to as a wireless communication gateway server apparatus 24 is installed at an access point to a network, in order to access the network from a portable terminal 20.

This wireless communication gateway server apparatus 24 and the portable terminal 20 are connected to each other through a wireless communication line. In this wireless communication line, a communication is done, for example, by using a communication protocol referred to as WAP (Wireless Application Protocol) optimized for the characteristic of a wireless communication and a portable terminal. Also, a communication between the wireless communication gateway server apparatus 24 and the information source server apparatus 26 on the network is done in accordance with a standard protocol for the network [for example, in a case of the Internet, an Internet standard protocol {for example, HTTP (Hyper-Text Transfer Protocol) and TCP (Transmission Control Protocol)}].

The wireless communication gateway server apparatus 24 has an executing device for executing: a process for carrying out a protocol conversion between a communication protocol on a wireless communication line and a standard protocol on a network on which the information source server apparatus 26 exists; a data conversion process, for example, a process in which if information stored in the information source server apparatus 26 on the network is a document written under a HTML (Hypertext Markup Language) type, this document in the HTML type is converted into a document in a WML (Wireless Application Language) type used in the WAP; and a process in which if a document stored in information source server apparatus S on a network is, for example, a WML document in a text type, it is converted into a binary type, and then a data is compressed.

Also, the wireless communication gateway server apparatus 24 has a buffer memory emulator 25, as shown in FIG. 1. In this apparatus, in order to solve the unstableness in a communication condition caused by a band width and a delay amount in a wireless data communication network and an intermission in a wireless communication line, this buffer memory emulator 25 transiently stores therein a data sent by the information source server apparatus. The data for the buffer memory emulator 25 means, for example a memory size and a consumed size of the buffer memory 2. The consumed size means, for example a size used for storing the information from the information source server apparatus 7. Then, it monitors a condition of a buffer memory at a portable terminal, carries out a control so that the data does not overflow the buffer memory, and sends the data to the portable terminal.

Moreover, the portable terminal can be freely moved. Thus, it is necessary that a current area in which the portable terminal itself presently exists is always reported to a system side (a switching station) (this function is referred to as a position register).

The method for registering a position will be described below. An area number indicative of a position register area is always reported by a base station (not shown). The portable terminal 20 always compares an area number stored in the self-terminal with the reported area number, and sends a position register signal through the base station to a switching apparatus if those area numbers do not coincide with each other. The switching apparatus converts the position register signal sent by the portable terminal into a position information on which a line setting can be performed, and then registers it in a position information database 23. Thus, the system side can recognize a new position of the portable terminal 20. Hence, for example, if this portable terminal is accessed, a switching apparatus 22 can send a number information of the portable terminal to the position information database 23 and thereby connect a call to a desirable portable terminal, in accordance with information indicative of a position in which the portable terminal exists, from the number information fed back from the position information database 23.

The method for the portable terminal 20 to access the information source server apparatus 26 on the network will be described below, in the mobile communication system having the above-mentioned configuration. At first, when a power source of the portable terminal 20 is turned on, a position information of the portable terminal 20 is registered in the position information database 23 through the nearest base station. Next, since this portable terminal 20 issues a call to a telephone number of an access point which is registered in advance, a call is established between it and a wireless communication gateway server apparatus 24 having the access point.

An access request to the information source server apparatus 26 from the portable terminal 20 is reported to the wireless communication gateway server apparatus in a suitable wireless data protocol, for example, in the HTTP or WAP. So, it is possible to select and specify information source server apparatus by using URL (Uniform Resource Locator).

However, in the above-mentioned conventional mobile communication system, when the portable terminal accesses the information source server apparatus existing on the network, it must telephone a registered telephone number of only one access point assigned to the portable terminal, and then access the network through this access point. Thus, if a congestion is induced in this access point, a user of the portable terminal must again telephone the access point after a while. Also, it is impossible to obtain an insurance that the user can access the network after an elapse of a predetermined time.

If the demand from the users becomes equal to or greater than the number of terminals (the congestion state) that can be accommodated in the access point used when the wireless communication gateway server apparatus and the portable terminal communicate with each other, it is necessary to separately install the access point used by the portable terminal, in order to reduce a connection wait time of the user. At this time, a process for initializing a buffer memory within the wireless communication gateway server apparatus just before must be initialized. Hence, the user must wait by a time necessary for the initialization and a time for the connection to another access point.

If because of the movement of the portable terminal or the occurrence of the congestion in the access point disables the establishment of the connection to the wireless communication gateway server apparatus used just before, the connection to the wireless communication gateway server apparatus is done through another access point. However, even in this case, it is necessary to initialize the process for monitoring the buffer memory. In this case, the user must further wait by the switching time in the wireless communication gateway server apparatuses, in addition to the above-mentioned delay time. The fact that the user must wait not only results in a waste of a communication line resource, but also imposes an economic burden on the user when a communication fee or a service accounting based on a time is charged.

The techniques with regard to the switched capacitor type digital-analog converter are disclosed in Japanese Laid Open Patent Application (JP-A-H7-264662), Japanese Laid Open Patent Application (JP-A-H9-130861), Japanese Laid Open Patent Application (JP-A-H10-210533), Japanese Laid Open Patent Application (JP-A-H10-327454) and Japanese Laid Open Patent Application (JP-A-H11-83976).

The present invention is accomplished in view of the above mentioned problems.

SUMMARY OF THE INVENTION

The present invention provides a mobile communication system which can reduce a time required for a portable terminal to access information source server apparatus existing on a network, a wireless communication gateway server apparatus, a position information calculation system, a method for reducing a connection time in the system, and a record medium for recording therein a connection time reduction program.

The mobile wireless communication system according to the invention is provided with information source server apparatus (7), a portable terminal (1), a plurality of wireless communication gateway server apparatuses (5A, 5B) a switching apparatus (3) and a wireless telephony server (8). The information source server apparatus stores information. The portable terminal carrying out a communication with the information source server apparatus and having a buffer memory (2) which stores the information transmitted from the information source server apparatus. The plurality of wireless communication gateway server apparatuses, wherein a specific one of the plurality of wireless communication gateway server apparatuses which is determined based on an informed position of the portable terminal, has a buffer memory emulator which stores specification data which represents a specification of the buffer memory and transmitters the information from the information source server apparatus to the portable terminal based on the specification data. The switching apparatus setting a specific one connection between the portable terminal and a specific one wireless communication gateway server apparatus or another connection between the portable terminal and another wireless communication gateway server apparatus, which is used when the communication between the portable terminal and the specific one wireless communication gateway server apparatus congests. The wireless telephony server apparatus informing the position of the portable terminal to the plurality of wireless communication gateway server apparatuses.

In another mobile wireless communication system according to the invention, the specific one wireless communication gateway server apparatus (5A) requests the switching apparatus to change a connection from the specific one connection to the other connection based on the informed position.

In another mobile wireless communication system according to the invention, the specific one wireless communication gateway server apparatus (5A) decides the other wireless communication gateway server apparatus (5B) so that a new connecting destination of a connection between the one connection and the other connection is determined.

In another mobile wireless communication system according to the invention, the specific one wireless communication gateway server apparatus (5A) informs to the other wireless communication gateway server apparatus the specification data which is read from the buffer memory emulator. Furthermore, the other wireless communication gateway server apparatus (5A) stores the read specification data in the buffer memory emulator thereof and transfers the information from the information source server apparatus to the portable terminal based on the read specification data.

Another mobile wireless communication system is provided with a network which is connected to the specific one wireless communication gateway server apparatus, the another wireless communication gateway server apparatus, the switching apparatus and the wireless telephony server apparatus. In the above mobile wireless communication system, the specific one wireless communication gateway server apparatus, the another wireless communication gateway server apparatus, the switching apparatus and the wireless telephony server apparatus communicate through the network.

Another mobile wireless communication system is provided with an internet network which is connected to the specific one wireless communication gateway server apparatus, the another wireless communication gateway server apparatus, the switching apparatus and the wireless telephony server apparatus. In the above mobile wireless communication system, the specific one wireless communication gateway server apparatus, the another wireless communication gateway server apparatus, the switching apparatus and the wireless telephony server apparatus communicate through the internet network.

Another mobile wireless communication system is provided with a satellite network which is connected to the specific one wireless communication gateway server apparatus, the another wireless communication gateway server apparatus, the switching apparatus and the wireless telephony server apparatus. In the above mobile wireless communication system, the specific one wireless communication gateway server apparatus, the another wireless communication gateway server apparatus, the switching apparatus and the wireless telephony server apparatus communicate through the satellite network.

The mobile wireless communication system according to the invention is provided with an information source server apparatus (7), a portable terminal (1), a wireless communication gateway server apparatus (5A), a switching apparatus (3), a wireless telephony server apparatus (8). The information source server apparatus stores information. The portable terminal carries out a communication with the information source server apparatus and has a buffer memory which stores the information transmitted from the information source server apparatus. The wireless communication gateway server apparatus has a buffer memory emulator which stores specification data which represents a specification of the buffer memory. Furthermore, the wireless communication gateway server apparatus has a plurality of access points (APa, APb), specific one of which is determined based on an informed position of the portable terminal. Furthermore, the wireless communication gateway server apparatus transfers the information from the information source server apparatus to the portable terminal based on the specification data. The switching apparatus sets specific one connection between the portable terminal and specific one access point or another connection between the portable terminal and another access point, which is used when the one access point congests. The wireless telephony server apparatus informs the position of the portable terminal to the wireless communication gateway server apparatus.

In another mobile wireless communication system, the wireless communication gateway server apparatus requests the switching apparatus to change a connection from the specific one connection to the other connection based on the informed position.

In another mobile wireless communication system the wireless communication gateway server apparatus refers the specification data in the buffer memory emulator to access the portable terminal through the other access point.

Another mobile wireless communication system is provided with a network which is connected to the wireless communication gateway server apparatus, the switching apparatus and the wireless telephony server apparatus. In the above mobile wireless communication system, the wireless communication gateway server apparatus, the switching apparatus and the wireless telephony server apparatus communicate through the network.

Another mobile wireless communication system is provided with an internet network which is connected to the wireless communication gateway server apparatus, the switching apparatus and the wireless telephony server apparatus. In the above mobile wireless communication system the wireless communication gateway server apparatus, the switching apparatus and the wireless telephony server apparatus communicate through the internet network. Another mobile wireless communication system is provided with a satellite network which is connected to the wireless communication gateway server apparatus, the switching apparatus and the wireless telephony server apparatus. In the above mobile wireless communication system, the wireless communication gateway server apparatus, the switching apparatus and the wireless telephony server apparatus communicate through the satellite network.

The method for mobile wireless communication system is provided with a storing, a changing and transferring. In the storing, a specification data which represents a specification of a buffer memory of a portable terminal is stored in a buffer memory emulator of specific one wireless communication gateway server apparatus when the portable terminal is connected to the specific one wireless communication gateway server apparatus. In the changing, specific one connection between the portable terminal and the specific one wireless communication gateway server apparatus is changed to another connection between the portable terminal and one of another wireless communication gateway server apparatus, which is used when the specific one wireless communication gateway server apparatus has a congestion. In the transferring, the specification data from the specific one wireless communication gateway server apparatus is transferred to the another wireless communication gateway server apparatus when the other connection is set.

Another method for mobile wireless communication system is provided with a informing and a requesting. In the informing, a position of the portable terminal is informed from a wireless telephony server apparatus to the specific one wireless communication gateway server apparatus. In the requesting, a change from a specific one connection to the other connection is requested to a switching apparatus which sets a connection for the portable terminal based on the informed position.

Another method for mobile wireless communication system is provided with a communicating. In the communicating, the specific one wireless communication gateway server apparatus, another wireless communication gateway server apparatus, the another the switching apparatus and the wireless telephony server apparatus communicate are communicated through a network.

In another method for mobile wireless communication system, the specific one wireless communication gateway server apparatus, another wireless communication gateway server apparatus, the switching apparatus and the wireless telephony server apparatus are communicated through an internet network.

In another method for mobile wireless communication system, the specific one wireless communication gateway server apparatus, another wireless communication gateway server apparatus, the switching apparatus and the wireless telephony server apparatus are communicated through a satellite network.

In another method for mobile wireless communication system, specific one connection between the portable terminal and one access point of a wireless communication gateway server apparatus is changed to another connection between the portable terminal and another access point of the wireless communication gateway server apparatus, which is used when the wireless communication gateway server apparatus has a congestion.

The above method of mobile wireless communication system is provided with informing and requesting. In the above informing, a position of the portable terminal from a wireless telephony server apparatus is informed to the wireless communication gateway server apparatus. In the requesting, a change from a specific one connection to the other connection is requested to a switching apparatus which sets a connection for the portable terminal based on the informed position.

In the above method for mobile wireless communication system, the wireless communication gateway server apparatus, the switching apparatus and the wireless telephony server apparatus are communicated through a network.

In the above method for mobile wireless communication system, the wireless communication gateway server apparatus, the switching apparatus and the wireless telephony server apparatus are communicated through an internet network.

In the above method for mobile wireless communication system, the wireless communication gateway server apparatus, the switching apparatus and the wireless telephony server apparatus are communicated through a satellite network.

The wireless communication gateway server apparatus according to the invention is provided with a buffer memory emulator. The buffer memory emulator stores a specification data which represents a specification of a buffer memory of a portable terminal. In the above wireless communication gateway server apparatus, specific one connection with the portable terminal is changed to another connection between the portable terminal and another wireless communication gateway server apparatus, which is used when a congestion of the specific one connection is happened. In the above wireless communication gateway server apparatus the specification data in the buffer memory is transferred to the another wireless communication gateway server apparatus.

In the above wireless communication gateway server apparatus, a change is requested to the switching apparatus which sets a connection for the portable terminal from the specific one connection to the other connection based on a position data of the portable terminal.

The above wireless communication gateway server apparatus is provided with a plurality of access points, wherein a specific one of the plurality of access points which is determined based on an informed position of the portable terminal.

In the above wireless communication gateway server apparatus, a change is requested to the switching apparatus which sets a connection for the portable terminal from a specific one connection of the specific one access point to another connection of another access point based on the position of the portable terminal.

DESCRIPTION OF THE PREFERRED EMBODIMENTS

The embodiments with regard to a mobile communication system, a wireless communication gateway server apparatus, a position information calculation system, a method for reducing a connection time in the system and a record medium for recording therein a connection time reduction program, according to the present invention, will be described below in detail with reference to the attached drawings.

Figure 2:
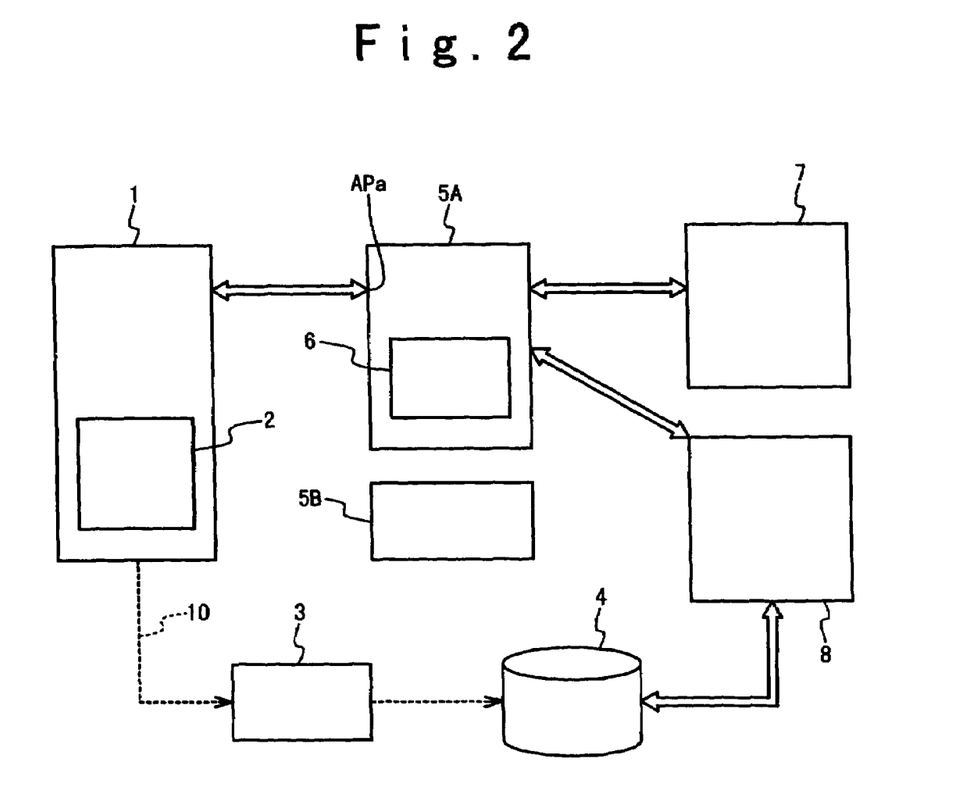
FIG. 2 is a block diagram showing a configuration of an embodiment according to the present invention.

FIG. 2 shows the configuration of the embodiment according to the present invention. The embodiment according to the record medium for recording therein the connection time reduction program can be attained by storing a record medium, which records therein a control program, in the following respective devices. As this record medium, a semiconductor memory, an optical disc, a magneto-optic disc, a magnetic record medium and the like can be used.

As shown in FIG. 2, this embodiment is provided with: a portable terminal 1 which uses a wireless communication line; a switching apparatus 3 for carrying out the desirable connection, based on a telephone number of a destination included in a call connection information from the portable terminal 1 and the like; a position information database 4 for recording therein a current position of the portable terminal 1; a wireless communication gateway server apparatus 5 which exists on a network and communicates through the wireless communication line with the portable terminal 1; information source server apparatus 7 that exists on the network on which the wireless communication gateway server apparatus 5 exists; and a wireless telephony server apparatus 8 that exists on the network and can obtain a position information of the portable terminal 1 from the position information database 4. In this embodiment, between a plurality of wireless communication gateway server apparatuses 5, each of the wireless communication gateway server apparatuses 5, the information source server apparatus 7 and the wireless telephony server apparatus 8 are connected through the Internet to each other, and they can send and receive information to and from each other. However, this network is not limited to the Internet.

The portable terminal 1 is constituted by a terminal which carries out a communication by using a wireless communication line such as PHS (Personal Handy-phone System), a portable telephone and the like. Also, the portable terminal 1 has a buffer memory 2 for storing therein information transferred by the information source server apparatus 7 and the like. The information means, for example HTML(Hypertext Markup Language) data for a web site.

In order that a system side (a switching apparatus side) recognizes a position of the movable portable terminal 1, the position information database 4 captures an identifier and a position of a base station belonging to a cell on a control route 10 in the wireless communication line, in a case of a cell type, and always registers therein the newest position of the portable terminal 1. Actually, a base station (not shown) always transmits a position information of the base station within the cell. The portable terminal 1 stores therein the position information transmitted by the nearest base station. When because of a movement of a user, the portable terminal 1 is moved from a cell managed by the base station to another cell, if a position information received at that location is different from the stored position information, the stored position information is changed into the newly received position information, and a register request with regard to the change into a new position is performed on the base station. This position information is registered in the position information database 4 through a common line signal network from the switching apparatus 3.

The switching apparatus 3 switches a connection to a line for a destination indicated by a telephone number, in accordance with the telephone number included in the connection request from a wireless communication gateway server apparatus, or a portable terminal.

The position information database 4 has a function of searching the stored position information of the portable terminal, in accordance with an individual number of a portable terminal transferred by the wireless telephony server apparatus 8, and finding out a cell ID indicative of a cell to which the portable terminal currently belongs, and then transmitting to a request source. Especially, in a case of a PDC (Personal Digital Cellular phone) type, this position information database 4 is referred to as HLR (Home Location Register).

Figure 3:
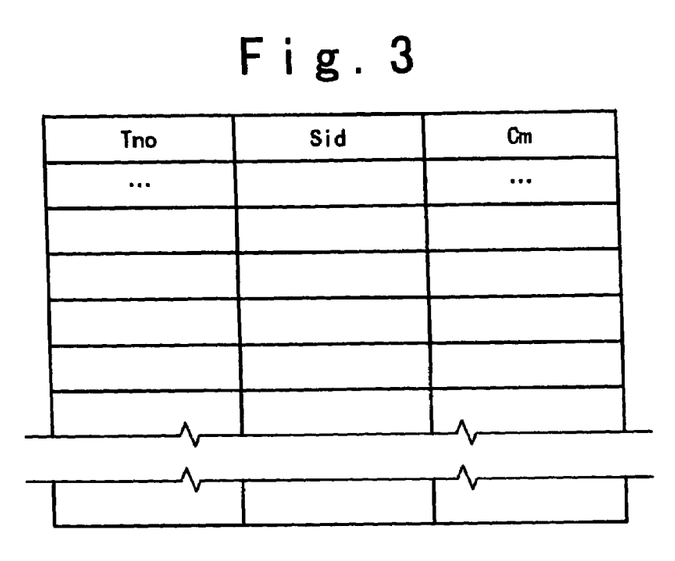
FIG. 3 is a view showing a management table.

FIG. 3 shows an example of a management table managed by the position information database. As shown in FIG. 3, the management table managed by the position information database records therein a terminal number of each portable terminal, a cell ID indicative of a position of a base station to which the portable terminal currently belongs, an accounting meter for calculating a usage fee for each portable terminal and the like.

The wireless communication gateway server apparatus 5 has a buffer memory emulator 6. This buffer memory emulator 6, in order to solve the unstableness of a communication condition caused by a network, a band width and a delay amount of the wireless communication line network, and an intermission of the wireless communication line, transiently accumulates therein a data transmitted by the information source server apparatus 7, and monitors a condition of the buffer memory 2 which is mounted in the portable terminal 1 and stores therein the data, and carries out a control so that the data does not overflow the buffer memory 2, and then sends the data to the portable terminal 1.

Also, the wireless communication gateway server apparatus 5 has the following functions in addition to the above-mentioned function. For example, it has: a function in which if the WAP is used for a communication protocol in the portable terminal 1 using the wireless communication line and then a standard protocol in the Internet is used for a communication protocol in the network, a protocol conversion is done between the communication protocol in the WAP and the standard protocol in the network; a data conversion function, for example, a function in which if a document in the HTML type is stored in the information source server apparatus 7 on the network, the document in the HTML type is converted into a document in the WML (Wireless Markup Language) type used in the WAP, a function in which if a document in the text type is stored in the information source server apparatus 7 on the network, the document in the text type is converted into the binary type, and the data is compressed; and the like.

The information source server apparatus 7, which exists on the network, transmits the stored information, in accordance with a request from the portable terminal The wireless telephony server apparatus 8 is a kind of information source server apparatus for providing information. So, it can use the position information database 4 to thereby obtain information with regard to the portable terminal 1 registered in the position information database 4.

A first object of a first embodiment having the above-mentioned configuration lies in a reduction of a time necessary for a connection process to the Internet of users by establishing another access point if the demand from the users becomes equal to or greater than the number of terminals that can be accommodated in an access point (a congestion state), in the access point serving as a connection point to the Internet, when the portable terminal 1 accesses information source server apparatus 7 connected to the Internet.

A second object of the embodiment having the above-mentioned configuration lies in a reduction of a time necessary for a re-connection by preparing in advance the condition of a buffer memory before a disconnection with regard to the portable terminal 1, in the wireless communication gateway server apparatus 5, on the basis of a connected position, if a congestion is induced in an access point connected just before, when the portable terminal 1 again accesses information source server apparatus, at a time of the disconnection of the wireless communication line or after a user ends a communication.

In order to attain the first object, the wireless communication gateway server apparatus 5, if a congestion is induced in an access point managed by it, instructs the switching apparatus 3 to carry out a connection to another access point. Then, the switching apparatus 3 carries out a process for carrying out a connection to the instructed access point, if the portable terminal 1 issues a call to the access point in which the congestion is induced.

Accordingly, it is possible to solve the trouble induced when the conventional portable terminal accesses the network, and the trouble in which since the number of access points is one, if the congestion is induced in the access point, it must issue a call to the access point again after a while or the connection can not be established even if it tries to issue a large number of calls to the access point.

In order to attain the second object, the wireless communication gateway server apparatus 5 for transiently storing in a buffer memory (not shown) information transferred by the information source server apparatus 7 and a position and an attribute value of a portable terminal connected to an access point, stores therein the above-mentioned information initialized at the stage when the communication with the portable terminal is disconnected, without the initialization for a certain period. Also, the wireless communication gateway server apparatus 5 recognizes the histories with regard to an individual number of a portable terminal that is connected to the wireless telephony server apparatus 8 for a certain period and also connected to an access point which it belongs, and information about a cell ID in which the portable terminal exists. This can be attained by the following operations. That is, the wireless communication gateway server apparatus 5 transfers the kind report sent by the portable terminal to the wireless telephony server apparatus 8 for each certain cycle. The wireless telephony server apparatus 8 transfers the sent kind report to the position information database 4. Then, it obtains a cell ID indicative of a cell to which the portable terminal 1 currently belongs, and then transfers to the wireless communication gateway server apparatus 5. By the way, the kind report transferred to the wireless communication gateway server apparatus 5 from the portable terminal 1 at the time of the connection to the access point includes the terminal attribute indicative of an individual number of the portable terminal, an amount of the buffer memory, a size of a display region, a processing ability and the like.

Thus, after the wireless communication line is disconnected or after the user of the portable terminal 1 ends the communication, when the portable terminal again accesses the information source server apparatus 7, if a congestion is induced in an access point and thereby the portable terminal is connected to another access point, since the wireless communication gateway server apparatus 5 stores therein the information transferred by the information source server apparatus 7 and the position and the attribute value of the portable terminal connected to the access point, it is possible to continue the process in the buffer memory emulator 6 and also possible to continue the services such as the accounting process and the like.

Even if the movement of the user of the portable terminal 1 causes the portable terminal 1 to be connected to another access point different from an access point connected just before and further the access point is a wireless communication gateway server apparatus different from a wireless communication gateway server apparatus carrying out a process just before, the wireless communication gateway server apparatus sends a kind report of the portable terminal to the wireless telephony server apparatus 8. The wireless telephony server apparatus 8 obtains the position information before and after the connection to the portable terminal from the position information database 4, and compares them with each other, and then finds out the wireless communication gateway server apparatus used just before. Thus, various parameters for the buffer memory emulator can be obtained from the wireless communication gateway server apparatus connected just before. Hence, it is possible to reduce the time necessary for the connection process and also possible to continue the services such as the accounting process and the like. By the way, the various parameters for the buffer memory emulator 6 include a parameter indicative of a condition of the buffer memory, a parameter indicative of an attribute of a portable terminal, a parameter indicative of a position information of the portable terminal and the like.

A series of flows in the above-mentioned processes according to this embodiment will be described below in detail.

Figure 4:
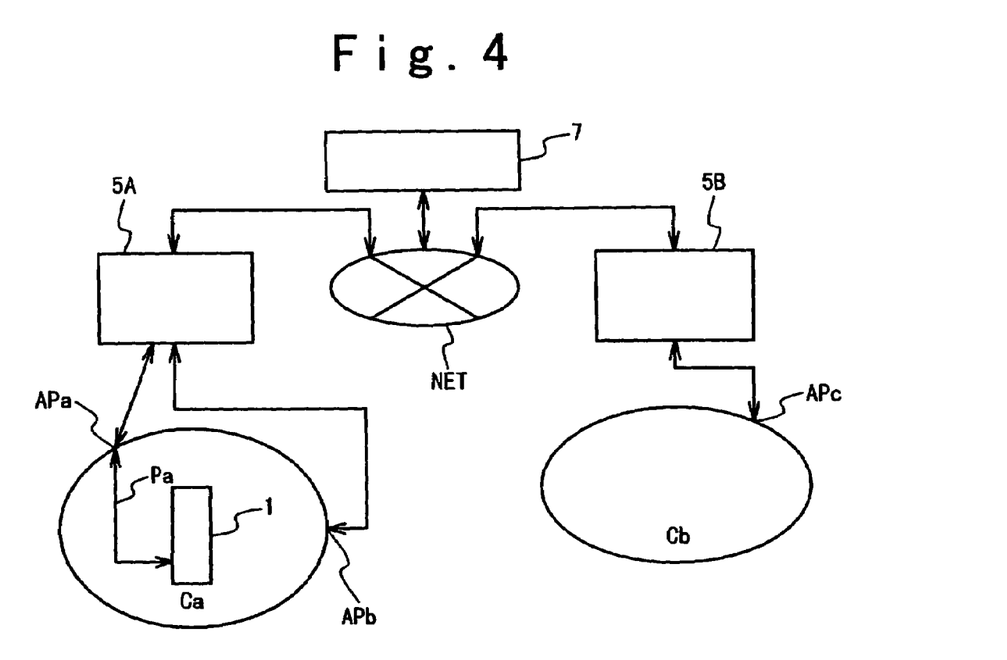
FIG. 4 is a view showing a configuration of an embodiment.

As shown in FIG. 2, the portable terminal 1 captures the identifier and the position of the base station belonging to the cell on the control route 10 in the wireless communication line, in the case of the cell type, and always registers the newest position in the position information database 4. Also, the portable terminal 1 is connected to the wireless communication gateway server apparatus 5 through the wireless communication network up to the access point. The connection to the wireless communication gateway server apparatus 5 from the portable terminal 1 is established by issuing a call to a telephone number of the access point assigned to the portable terminal. After that, the communication route to the wireless communication gateway server apparatus is established through a proper wireless communication protocol, for example, the HTTP or the WAP, as shown in FIG. 4.

The portable terminal 1, when it is connected to the wireless communication gateway server apparatus 5, transfers the kind report to identify the portable terminal, to the wireless communication gateway server apparatus 5. This kind report includes the terminal attribute, such as the individual number of the portable terminal, the amount of the buffer memory, the size of the display region, the processing ability and the like.

The wireless communication gateway server apparatus 5 validates the legality of the portable terminal, in accordance with the kind report obtained from the portable terminal 1. In this process, the wireless communication gateway server apparatus firstly transfers the kind report sent by the portable terminal to the wireless telephony server apparatus. The wireless telephony server apparatus transfers the individual number of the portable terminal from the transferred kind report to the position information database, and obtains the kind report of the portable terminal registered in the position information database. Then, the legality of the portable terminal is validated by comparing those kind reports with each other.

The portable terminal can select and specify information source server 7 by specifying URL (Uniform Resource Locator) of information source server apparatus 7 on a network from which a user desires to obtain information.

The wireless communication gateway server apparatus 5, when the legality of the portable terminal is proved, converts the wireless communication protocol used in the communication with the portable terminal into a standard protocol in the Internet, for example, a communication protocol based on the HTTP or the TCP, and then communicates with the information source server apparatus 7 requested by the portable terminal 1. Thus, the wireless communication gateway server apparatus 5 can obtain the information stored in the information source server apparatus 7. The wireless communication gateway server apparatus 5 stores the information sent by the information source server apparatus 7 in a buffer memory (not shown).

At this time, in the wireless communication gateway server apparatus 5, in order to monitor the overflow of the buffer memory 2 on the terminal side, the buffer memory emulator 6 calculates a consumptive amount of the buffer memory based on the number of data packets received by the portable terminal 1 and the number of already processed packets.

Here, let us suppose that a congestion is induced in the access point, when the portable terminal again accesses the information source server apparatus 7, after the wireless communication line is disconnected or after a user ends the communication. The wireless telephony server apparatus 8, when the congestion is induced in the access point to which it belongs, instructs the switching apparatus 3 to carry out the connection to another access point. Then, the switching apparatus 3, when the portable terminal 1 issues a call to the access point in which the congestion is induced, carries out a process for switching a connection to the instructed access point.

Figure 6:
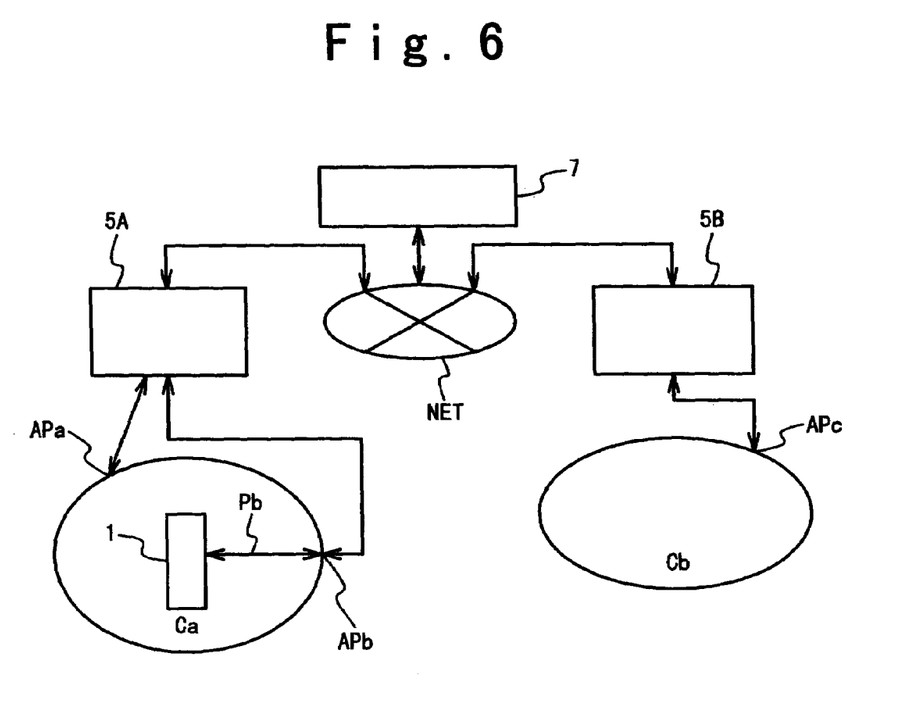
FIG. 6 is a view describing a communication example when it is connected to an access point managed by the same wireless communication gateway server apparatus.
Figure 7:
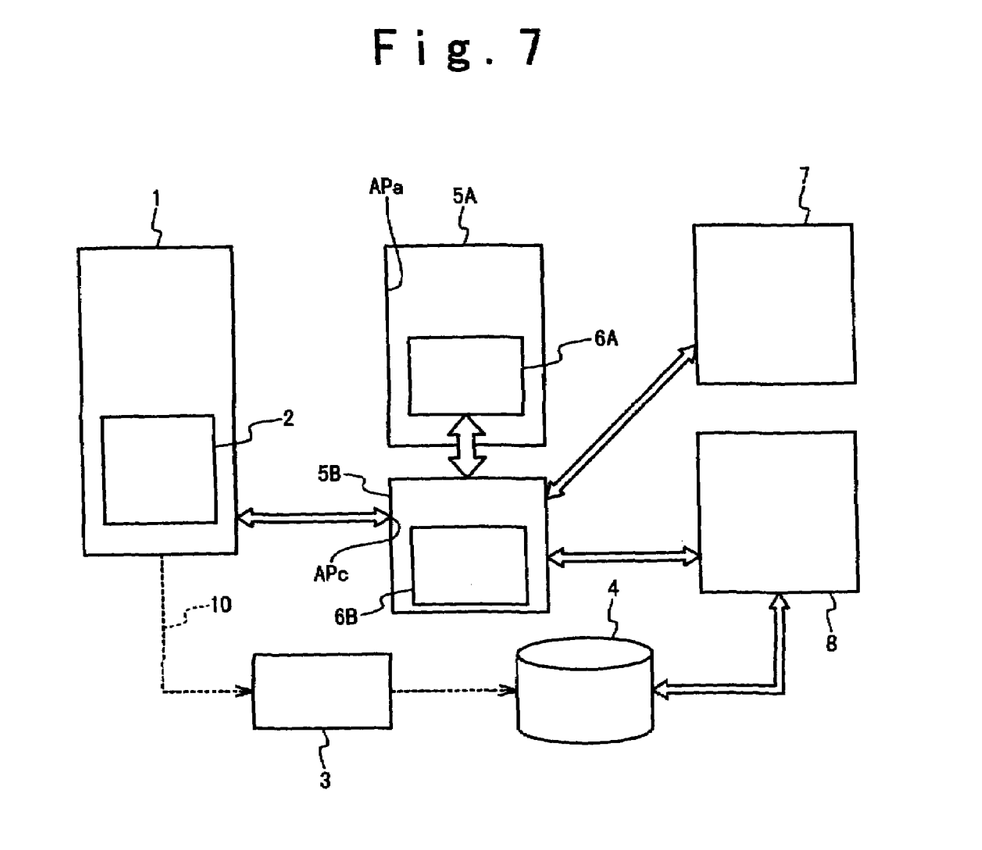
FIG. 7 is a view describing a communication example when it is connected to an access point managed by a different wireless communication gateway server apparatus.
Figure 8:
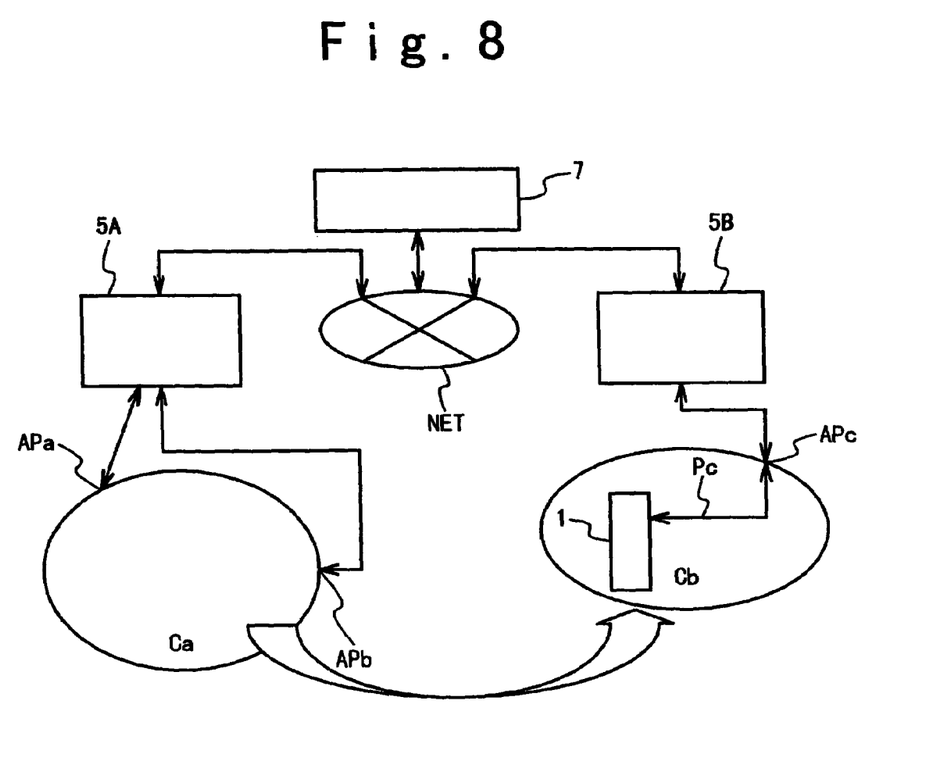
FIG. 8 is a view describing a communication example when it is connected to an access point managed by a different wireless communication gateway server apparatus.

At this time, when the portable terminal issues the call, the connection to the access point is done. However, there are the case that it is connected to an access point belonging to the same wireless communication gateway server apparatus, as shown in FIG. 5 or 6, and the case that it is connected to an access point belonging to a different wireless communication gateway server apparatus because of the movement of the portable terminal, as shown in FIG. 7 or 8.

Figure 5:
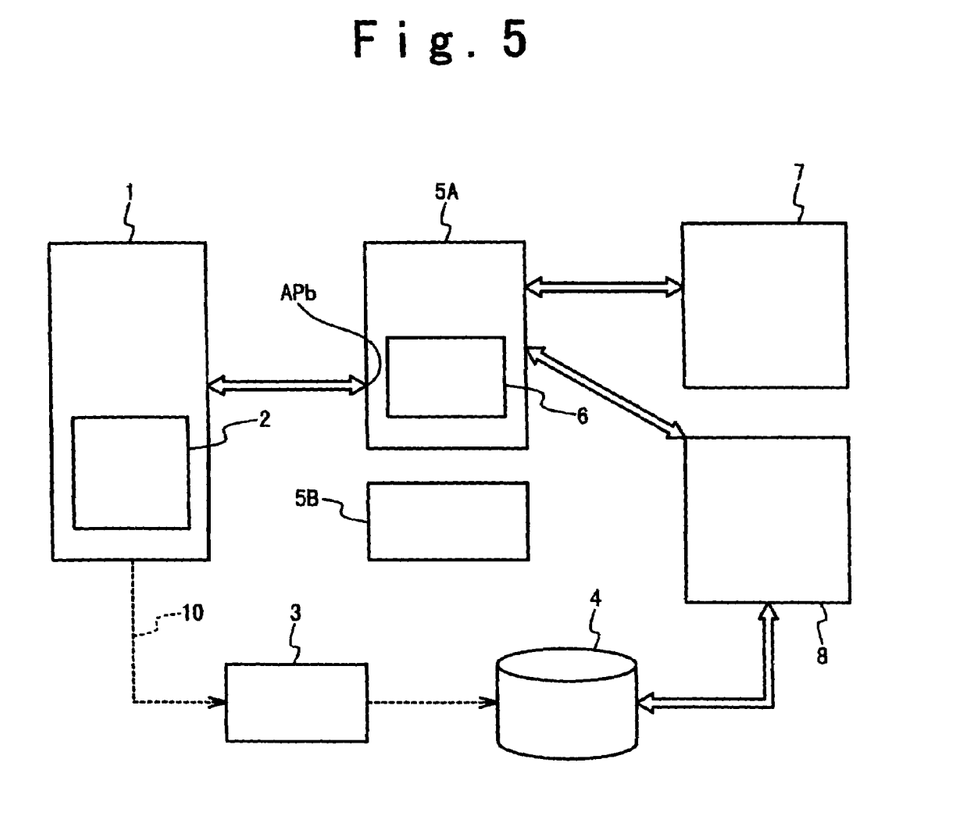
FIG. 5 is a view describing a communication example when it is connected to an access point managed by the same wireless communication gateway server apparatus.

At first, with reference to FIGS. 4 and 5, a communication example is described in which a congestion is induced in an illustrated access point A, and it is connected to an access point B belonging to the same wireless communication gateway server apparatus 5A at a time of a re-connection. For the purpose of simple explanation, it is assumed that the access points A, B belong to the same cell.

The wireless communication gateway server apparatus 5A, when it is connected to the portable terminal 1, compares a kind report reported by the portable terminal 1 with a kind report of the portable terminal 1, which is stored in advance in the buffer memory. Then, it is checked whether or not the portable terminal 1 requesting the connection is the same portable terminal. If it is checked that the reported kind report is identical to the kind report stored in the buffer memory, the buffer memory emulator 6 does not carry out the process for initializing information with regard to the portable terminal.

Thus, it is possible to reduce the time necessary for the process for connecting the portable terminal, and also possible to continue the services such as the accounting process and the like. Hence, when the communication fee or the service accounting based on the time is charged, it is possible to reduce the economic burden on the user.

In order to validate whether or not the legality of the portable terminal and the accounting process based on the provision service are started, the kind report of the portable terminal 1 at the time of the re-connection is sent through the Internet to the wireless telephony server apparatus 8. The wireless telephony server apparatus 8 sends the individual number of the portable terminal 1 included in the received kind report to the position information database 4, and obtains an attribute value registered in the position information database 4. This attribute value is compared with the attribute value obtained from the wireless communication gateway server apparatus 5A to thereby check the legality of the portable terminal. Moreover, an accounting condition of the portable terminal 1 is checked by obtaining an accounting condition registered in the position information database 4. After the check, the wireless telephony server apparatus 8 sends a check report to the wireless communication gateway server apparatus 5 sending the kind report. Accordingly, the process of the buffer memory emulator 6 is continued.

By the way, the wireless communication gateway server apparatus 5A checks a terminal which is connected to the wireless telephony server apparatus 8 at a certain cycle and connected to the access point that it belongs.

After the check, the wireless telephony server apparatus 8 sends a check report to the wireless communication gateway server apparatus 5A sending the kind report. Accordingly, the process of the buffer memory emulator 6 is continued.

Usually, the time necessary for the initializing process is longer than that of the checking process, because of the re-establishment of the configuration of the buffer memory. Thus, the connection time in this method is shorter than that of the conventional technique. Hence, the continuation of the process in the buffer memory emulator enables the services, such as the accounting process and the like, to be continued.

A case will be described below in which the portable terminal 1 is moved from a cell A to another cell B and it is connected to an access point C belonging to a different wireless communication gateway server apparatus 5B.

When the portable terminal 1 is connected to the same wireless communication gateway server apparatus at the time of the re-connection to the mobile communication system, a kind report of the portable terminal just before coincides with a kind report stored in the buffer memory emulator. However, if it is connected to a different wireless communication gateway server apparatus, the kind report reported by the portable terminal 1 does not coincide with a kind report of the portable terminal that is stored in the wireless communication gateway server apparatus.

So, the wireless communication gateway server apparatus sends the reported kind report of the portable terminal through the Internet to the wireless telephony server apparatus 8.

The wireless telephony server apparatus 8 accesses the position information database 4, and finds out a URL of the wireless communication gateway server apparatus 5A to which the portable terminal 1 requesting the connection is connected just before. Then, the found out URL of the wireless communication gateway server apparatus 5A is transferred to the wireless communication gateway server apparatus 5B sending the kind report.

The wireless communication gateway server apparatus 5B to which the URL is reported requests various parameters held by the buffer memory emulator, to the wireless communication gateway server apparatus 5B of the reported URL. The requested wireless communication gateway server apparatus 5A sends the various parameters held by the buffer memory emulator, to the wireless communication gateway server apparatus 5A of the request source. The wireless communication gateway server apparatus 5B receiving the report of the various parameters with regard to the portable terminal 1 copies the received various parameters of the portable terminal 1 to the buffer memory emulator.

At this time, the portable terminal 1 is acquired by the wireless telephony server apparatus 8, and the wireless telephony server apparatus 8 is cyclically connected to the wireless communication gateway server apparatuses 5A, 5B. Thus, it is possible to judge the terminal connected to the access point under the control of each wireless communication gateway server apparatus. Hence, as compared with the case that the portable terminal moved to another cell is initialized by the wireless communication gateway server apparatus, in this method, the process in the buffer memory emulator can be continued to thereby continue the services including the accounting process and the like. This results in the reduction in the time necessary for the connection process.

By the way, the above-mentioned embodiments, the HLR is used as the position information of the portable terminal. However, the position information of the portable terminal may be grasped by using a geodetic satellite system and the like.

Figure 9:
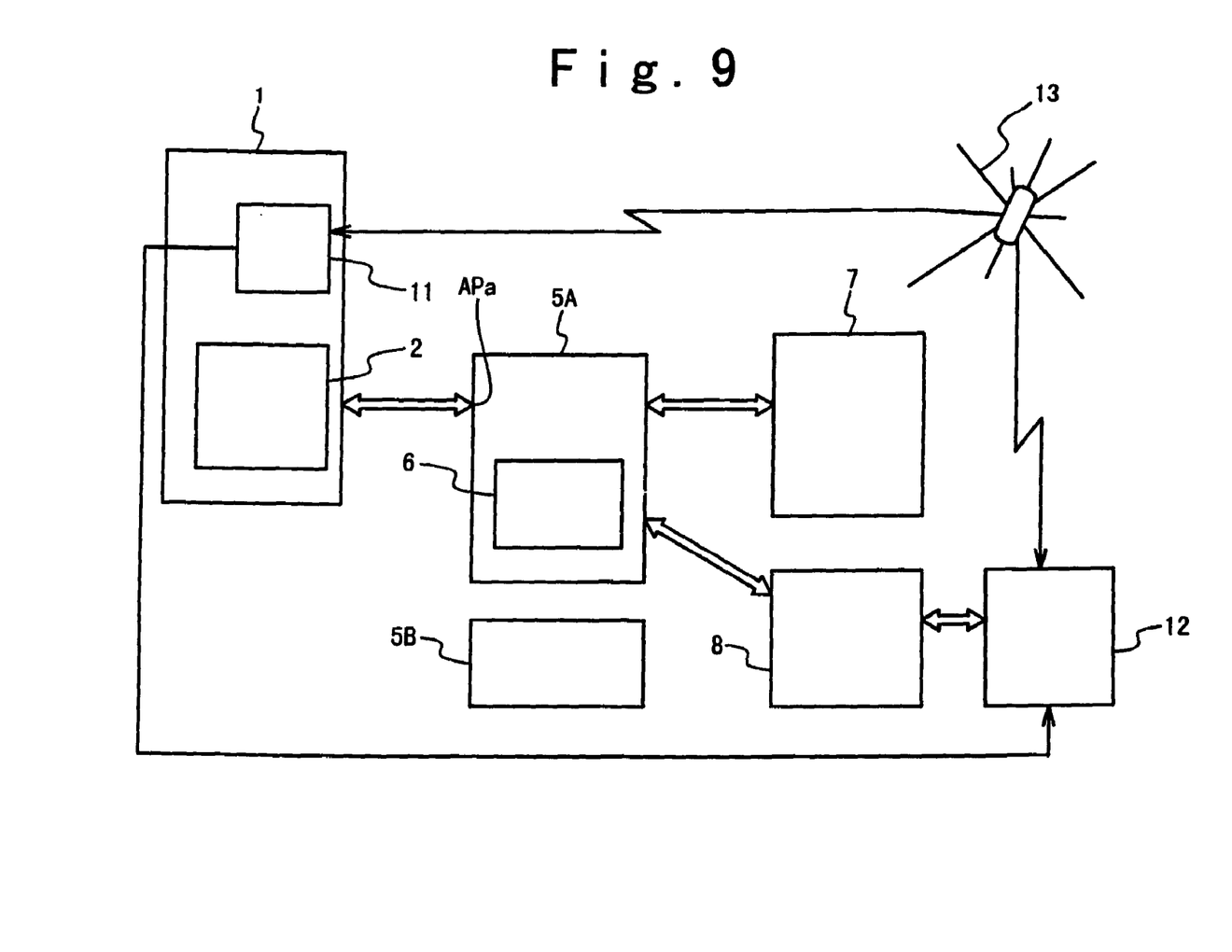
FIG. 9 is a block diagram showing a configuration of another embodiment.

In this case, as shown in FIG. 9, receivers for receiving an electric wave from a satellite 13 are mounted on a portable terminal side 1 and a ground station 12. The GPS ground station 12 can receive all electric waves from all satellites. However, a GPS receiver 11 of a portable terminal can not receive the electric waves from all the satellites. So, a satellite from which the GPS receiver 11 of this portable terminal can receive the electric wave is reported to the GPS ground station 12. Accordingly, the GPS ground station 12 can find out a position of the portable terminal from a position of the satellite from which this electric wave can be received. This position information is used by the wireless telephony server apparatus.

In the above-mentioned embodiments, the wireless communication gateway server apparatus and the wireless telephony server apparatus are connected to each other through the Internet. However, a private line may be used in order to make the secret degree higher.

The above-mentioned embodiments do not depend on a particular wireless communication protocol. Thus, at a time of an internationally mutual connection including a foreign country, if it is possible to exchange a position information or it is possible to exchange a transmission reception type for the various parameters of the buffer memory emulator and the terminal kind report, the application does not need to be limited to a particular territory.

Also, the similar effect can be attained even if the wireless communication gateway server apparatus also has the function of the wireless telephony server apparatus.

Moreover, in the above-mentioned embodiments, the access point is connected to specific one wireless communication gateway server apparatus. However, even if associated with the movement of the portable terminal, the access point automatically selects the nearest wireless communication gateway server apparatus, it is possible to apply the process similar to that of the connection to the above-mentioned different wireless communication gateway server apparatus, and it is possible to attain the similar effect.

ADVANTAGEOUS EFFECTS OF THE INVENTION

As can be evident from the above-mentioned explanations, in the mobile communication system, the method for reducing the connection time and the record medium for recording therein the program, the wireless communication gateway server apparatus, if a congestion is induced in an access point that is used as a connection point to a wireless communication line and managed by the wireless communication gateway server apparatus, instructs the switching apparatus to carry out the connection to another access point. Thus, even if the congestion is induced in the access point, it is possible to establish another access point in which the congestion is not induced. Hence, it is possible to reduce the time necessary for the connection of the portable terminal.

The wireless communication gateway server apparatus holds therein the information with regard to the portable terminal connected to the access point managed by the wireless communication gateway server apparatus and the information, which is transferred by the information source server apparatus and stored in the memory, for the predetermined period even after the end of the communication with the portable terminal. When the congestion is induced in the managed access point, it compares the information with regard to the portable terminal, which is sent by the portable terminal connected to another access point, with the information with regard to the portable terminal previously connected to the access point to which it belongs. If their information coincide with each other, the information with regard to the portable terminal connected to the access point and the information stored in the memory are used to then resume the communication with the portable terminal. Thus, it is possible to reduce the time required when the portable terminal tries the process for carrying out the connection to the network. Hence, if the communication fee and the service based on the time are charged, it is possible to reduce the economic burden on the user.

The wireless communication gateway server apparatus transfers the information with regard to the portable terminal connected to the access point managed by it to the wireless telephony server apparatus, and the wireless telephony server apparatus transfers the transferred information with regard to the portable terminal to the position information memory. Then, it is validated whether or not the position of the portable terminal is moved. If the portable terminal is moved, an address information on the network of the wireless communication gateway server apparatus connected before the movement is calculated from the position information. Thus, in the re-communication with the portable terminal whose the connection is once disconnected, the condition of the buffer memory can be prepared in advance in the wireless communication gateway server apparatus corresponding to the position to which the portable terminal is connected. Hence, it is possible to reduce the time in the connection processing time.

The wireless communication gateway server apparatus transfers the information with regard to the portable terminal connected to the access point managed it to the wireless telephony server apparatus, and the wireless telephony server apparatus transfers the information with regard to the portable terminal, which is reported by the portable terminal, to the position information memory, and it obtains the information with regard to the portable terminal, which is stored in the position information memory. The obtained information is compared with the information with regard to the portable terminal, which is reported by the wireless communication gate, to then validate the legality of the portable terminal. Thus, it is possible to protect an illegal portable terminal from accessing the network.

The wireless communication gateway server apparatus transfers the information with regard to the portable terminal connected to the access point managed by it to the wireless telephony server apparatus, and the wireless telephony server apparatus transfers the transferred information with regard to the portable terminal to the position information memory. So, the accounting condition of the portable terminal can be checked by checking the accounting condition of the portable terminal from the position information memory. When the access to the network is again tried, the accounting process can be continued.

The wireless communication gateway server apparatus grasps the histories of the information with regard to the portable terminal that is connected to the wireless telephony server apparatus in the certain cycle and connected to the access point to which it belongs, and the position information of the portable terminal. Thus, it is possible to judge the terminal connected to the access point under the control of the wireless communication gateway server apparatus.

The wireless communication gateway server apparatus of the present invention instructs the switching apparatus, which carries out a connection to a line specified by a destination equipment number included in a call if a congestion is induced in the access point that is managed by the wireless communication gateway server apparatus and used as a connection point to the wireless communication line, to carry out the connection to another access point, when a connection to an access point is requested by an equipment using the wireless communication line. Thus, it is possible to establish another access point in which the congestion is not induced even if the congestion is induced in the access point. Hence, it is possible to reduce the time necessary for the connection to the network of the equipment using the wireless communication line.

The wireless communication gateway server apparatus holds therein information with regard to an equipment connected to the access point managed by the wireless communication gateway server apparatus and information transferred from an equipment existing on the network, for a predetermined period even after the end of the communication with the equipment using the wireless communication line. Then, when a congestion is induced in the access point managed by it, it compares the information with regard to the equipment, which is sent by the equipment using the wireless communication line and connected to another access point, with information with regard to an equipment using a wireless communication line previously connected to the access point to which it belongs. If their information coincide with each other, the information with regard to the equipment connected to the access point and the stored information are used to then resume the communication with the equipment using the wireless communication line. Thus, it is possible to reduce the time required when the equipment using the wireless communication line tries the process for carrying out the connection to the network. Hence, when the communication fee and the service based on the time are charged, it is possible to reduce the economical burden on the user.

In the position information calculation system of the present invention, the wireless telephony server apparatus transfers information with regard to an equipment using a wireless communication line to the position information memory. Then, it is validated whether or not a position of the equipment is moved. If it is moved, an address information of a managing device for managing an access point to which the equipment using the wireless communication line is connected before the movement is calculated from the position information. For example, the calculated address information is transferred to the managing device for managing the access point. Thus, in a re-communication with the equipment using the wireless communication line whose connection is once disconnected, the information with regard to the equipment using the wireless communication line can be prepared in advance in the managing device corresponding to the position to which this equipment is connected. Hence, it is possible to reduce the connection processing time.

The wireless telephony server apparatus transfers an identification information of the equipment that is included in the information with regard to the equipment that is reported by the equipment using the wireless communication line, to the position information memory, and it obtains information with regard to the equipment that is stored in the position information memory. The obtained information is compared with information with regard to the equipment that is reported by a wireless communication gate. The legality of the equipment using the wireless communication line can be validated to thereby prevent an illegal equipment from accessing the network.

What is claimed is:

1. A mobile wireless communication system comprising:
    an information server;
    a portable terminal for carrying out a communication with the information server through a wireless communication line and comprising a buffer memory which stores information transmitted from the information server;
    a plurality of wireless communication gateway servers, wherein a first of the plurality of wireless communication gateway servers is determined based on a position of the portable terminal, and comprises a buffer memory emulator which stores specification data representing a specification of the buffer memory and transmits the information from the information server to the portable terminal based on the specification data;
    a switching apparatus for setting a connection between the portable terminal and said first wireless communication gateway server and for setting another connection between the portable terminal and a second wireless communication gateway server when the communication between the portable terminal and the first wireless communication gateway server congests; and
    a wireless telephony server for informing the position of the portable terminal to the plurality of wireless communication gateway servers,
    wherein said specification of the buffer memory comprises at least one of the buffer memory size and a consumed size of the buffer memory.

2. The mobile wireless communication system of claim 1, wherein the first wireless communication gateway server requests the switching apparatus to change a connection from the one connection to said another connection based on the informed position.

3. The mobile wireless communication system of claim 1, wherein the first wireless communication gateway server decides which of said plurality of wireless communication gateway servers comprises said second wireless communication gateway server.

4. The mobile wireless communication system of claim 1, wherein the first wireless communication gateway server provides to said second wireless communication gateway server the specification data which is read from the buffer memory emulator, and
    wherein said second wireless communication gateway server comprises a buffer memory emulator which stores the read specification data and wherein said second wireless communication gateway server transfers the information from the information server to the portable terminal based on the read specification data.

5. The mobile wireless communication system of claim 1, further comprising:
    a network connected to the first wireless communication gateway server, the second wireless communication gateway server, the switching apparatus and the wireless telephony server,
    wherein the first wireless communication gateway server, the second wireless communication gateway server, the switching apparatus and the wireless telephony server are capable of communicating through the network.

6. The mobile wireless communication system of claim 1, wherein the first wireless communication gateway server, the second wireless communication gateway server, the switching apparatus and the wireless telephony server are capable of communicating through the Internet.

7. The mobile wireless communication system of claim 1 comprising:
    a satellite network connected to the first wireless communication gateway server, the second wireless communication gateway server, the switching apparatus and the wireless telephony server,
    wherein the first wireless communication gateway server, the second wireless communication gateway server, the switching apparatus and the wireless telephony server are capable of communicating through the satellite network.

8. A mobile wireless communication system comprising:
    an information server;
    a portable terminal for carrying out a communication with the information server and comprising a buffer memory which stores the information transmitted from the information server;
    a wireless communication gateway server comprising a buffer memory emulator which stores specification data which represents a specification of the buffer memory and a plurality of access points, a specific one of said plurality of access points being determined based on a position of the portable terminal, and for transferring the information from the information server to the portable terminal based on the specification data;
    a switching apparatus for setting one connection between the portable terminal and a first of said plurality of access points and for setting another connection between the portable terminal and a second of said plurality of access points when the first access point congests; and
    a wireless telephony server for informing the position of the portable terminal to the wireless communication gateway server,
    wherein said specification of the buffer memory comprises at least one of the buffer memory size and a consumed size of the buffer memory.

9. The mobile wireless communication system of claim 8, wherein the wireless communication gateway server requests the switching apparatus to change a connection from the one connection to the another connection based on the informed position.

10. The mobile wireless communication system of claim 8, wherein the wireless communication gateway server refers to the specification data in the buffer memory emulator to access the portable terminal through the second access point.

11. The mobile wireless communication system of claim 8, further comprising:
a network connected to the wireless communication gateway server, the switching apparatus and the wireless telephony server,
wherein the wireless communication gateway server, the switching apparatus and the wireless telephony server are capable of communicating through the network.

12. The mobile wireless communication system of claim 8,
wherein the wireless communication gateway server, the switching apparatus and the wireless telephony server are capable of communicating through the Internet.

13. The mobile wireless communication system of claim 8 further comprising:
a satellite network connected to the wireless communication gateway server, the switching apparatus and the wireless telephony server,
wherein the wireless communication gateway server, the switching apparatus and the wireless telephony server are capable of communicating through the satellite network.

14. The mobile wireless communication system of claim 1, wherein the first wireless communication gateway server provides to said second wireless communication gateway server the specification data which is read from the buffer memory emulator.

15. The mobile wireless communication system of claim 1, wherein said second wireless communication gateway server comprises a buffer memory emulator which stores the read specification data.

16. The mobile wireless communication system of claim 1, wherein said second wireless communication gateway transfers the information from the information server to the portable terminal based on the read specification data.

17. The system of claim 1, wherein at least one of the plurality of wireless communication gateway servers converts between a wireless communication protocol with the portable terminal and a network protocol with the information server.

18. The system of claim 1, wherein the buffer memory emulator comprises a specification regarding the size of the buffer memory.

19. The system of claim 1, wherein the buffer memory emulator comprises a specification regarding an amount of available memory in the buffer memory.

20. The system of claim 1, further comprising a position register that registers a position of the portable terminal, wherein the wireless telephony server informs the position to the plurality of wireless communication gateway servers based upon the position registered in the position register.

21. The system of claim 20, wherein the switching apparatus registers the position of the portable terminal in the position register.

* * * * *